Oct. 13, 1925.
W. E. McLAREN
1,557,178
STEERING MECHANISM FOR CHILDREN'S VEHICLES
Filed Dec. 26, 1924
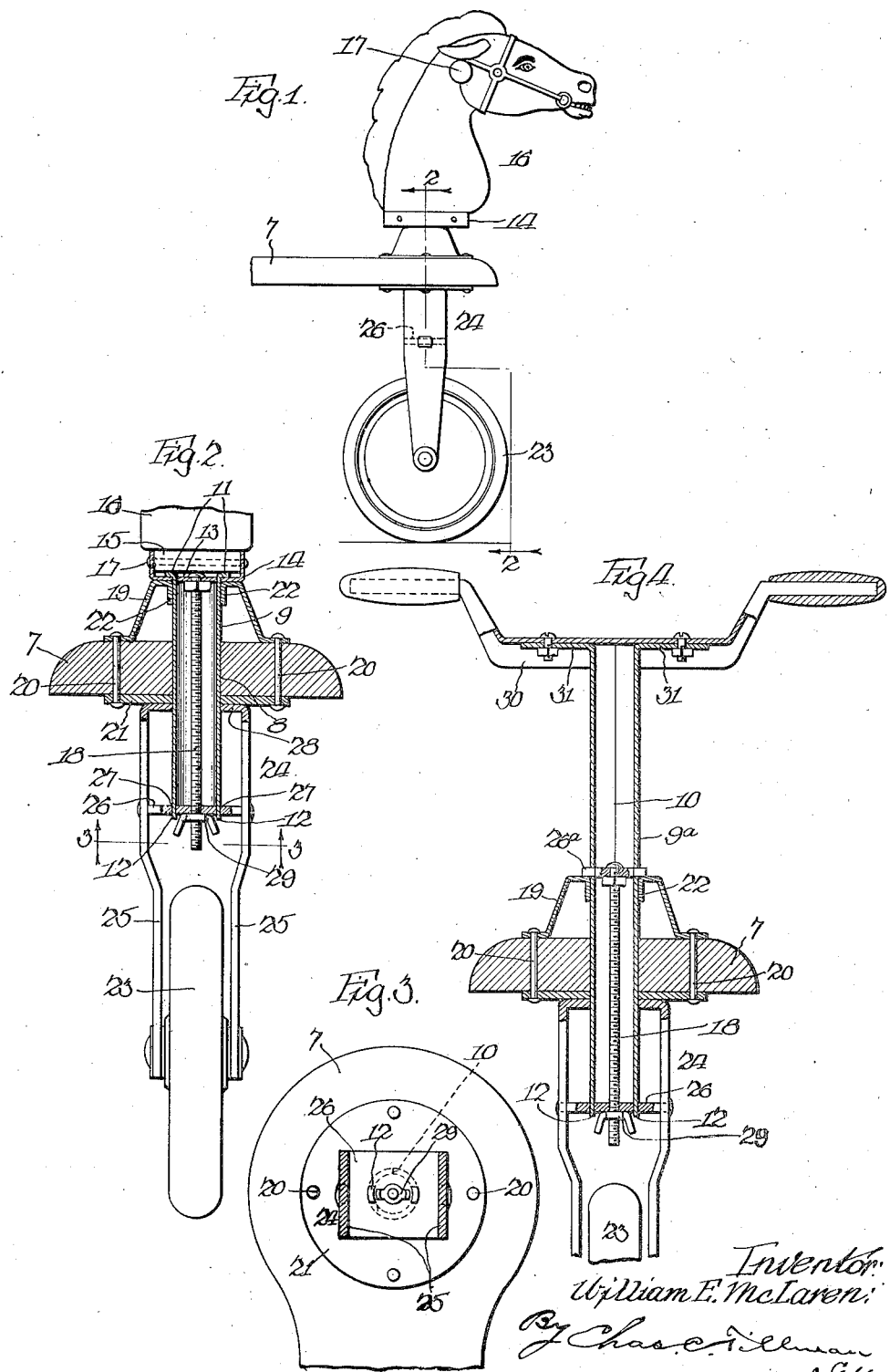
Inventor
William E. McLaren
By Chas. C. Tillman
Atty.

Patented Oct. 13, 1925.

1,557,178

UNITED STATES PATENT OFFICE.

WILLIAM E. McLAREN, OF LOS ANGELES, CALIFORNIA.

STEERING MECHANISM FOR CHILDREN'S VEHICLES.

Application filed December 26, 1924. Serial No. 757,978.

*To all whom it may concern:*

Be it known that I, WILLIAM E. McLAREN, a citizen of the United States, residing at Los Angeles, in the county of Los Angeles and State of California, have invented certain new and useful Improvements in Steering Mechanism for Children's Vehicles, of which the following is a specification.

This invention relates, generally, to vehicles, but particularly to improvements in a steering mechanism therefor, and it consists in certain peculiarities of the construction, novel features, arrangement and combination of the various parts thereof as will be hereinafter more fully set forth and specifically claimed.

In the present instance I have illustrated in the accompanying drawing, the invention in connection with a part of the seat board or frame and the front or steering wheel of a toy or child's vehicle having three wheels, and will hereinafter refer to it in such connection, as it is especially intended for use in steering such a vehicle, but I desire it to be distinctly understood that I may employ it as a steering device for suitable vehicles of any type or for any use without departing from the spirit of the invention.

The invention has for one of its objects the provision of a vehicle steering mechanism of very simple and inexpensive construction, yet of great strength and durability as well as attractive in appearance.

Another object is to furnish a highly efficient and stable bearing and support for the steering post and steering wheel.

A further object is to so construct and arrange detachable parts of the mechanism that they may be readily separated from one another, as well as from the seat board or frame of the vehicle, to the end, that the vehicle, as well as my improvements which cooperate therewith, can be packed into a compact form or package for shipment, yet can be readily assembled.

Other objects and advantages of the invention will be disclosed in the following description and explanation, which will be more readily understood when read in conjunction with the accompanying drawing, in which embodiments of the invention are illustrated, it being understood that modifications and changes may be resorted to without a departure from the spirit of the invention, so long as they fall within the scope of the appended claims forming a part hereof.

In the drawing,—

Fig. 1 is a view in side elevation of a portion of the seat board or frame of a vehicle showing a steering mechanism therefor embodying one form of the invention mounted thereon.

Fig. 2 is an enlarged vertical sectional view taken on line 2—2 of Fig. 1 looking in the direction indicated by the arrows.

Fig. 3 is a bottom plan view taken on line 3—3 of Fig. 2 of the drawing, and

Fig. 4 is a vertical sectional view of a modified form of the steering post and handle showing a part only of the steering wheel and its support.

Corresponding numerals of reference refer to like parts throughout the different views of the drawing.

Referring now more particularly to Figs. 1 to 3 of the drawing, the numeral 7 designates a portion of the horizontally disposed seat board or frame of a vehicle preferably of the "child's car" type, which is provided near its front end with a vertical opening 8 in which is rotatably mounted the steering post 9 which, for the purpose of economizing in weight and in the manufacture thereof, is by preference tubular in form and is made of a single piece of flat material or a blank bent so as to bring its longitudinal edges into contact or approximation with one another to form a tube, the seam provided by said edges being shown at 10 in Figs. 3 and 4 of the drawing. The post 9 has at its upper end a pair of diametrically disposed extensions 11 and at its lower end a pair of extensions 12. The extensions 11 are located in suitably spaced openings formed in the floor 13 of a cup-shaped collar 14 which is mounted on a reduced portion 15 of an upright member or steering head 16 which in the form of the invention now under consideration is by preference in the shape of the head and a part of the neck of a horse, as is clearly shown in Fig. 1 of the drawing. On the upper portion of the member 16 is transversely and horizontally mounted a detachable handle bar 17 which projects a suitable distance on each side of the member 16 and is employed for the purpose of being grasped by the hands of the user of the vehicle so as to turn the steering post and wheel with which it is connected.

By reference to Fig. 2 it will be seen that the floor 13 of the collar 14 is spaced from the lower end of the reduced portion 15 of the member 16 and it will be understood that the extensions 11 may be riveted or otherwise secured in place on said floor. The collar 14 is by preference secured to the reduced portion 15 by means of bolts 17 extended through suitable openings in the collar and said reduced portion of the steering head. A screw-threaded rod 18 is fixed at its upper end to the floor 13 of the collar 14 between the extensions 11 and extends downwardly through the post 9 to a point below the lower end of said post.

In order to afford a stable bearing for the steering post 9 and so as to prevent liability of wabbling movement thereof, a truncated or inverted cup-shaped member 19 is mounted on the upper surface of the seat board 7 with its periphery concentrically arranged with respect to the opening 8 in said board. The member 19 is secured to the upper surface of the board 7 by means of vertically disposed bolts 20 which also serve to secure a centrally apertured plate or disk 21 to the lower surface of said board with its aperture in register with the opening 8 of the board. The upper end of the member 19 is provided with a central opening for the support of the post 9 and around said opening with a depending annular flange 22, which serves to laterally brace the post above the seat board, as is apparent.

The hanger or support for the steering wheel 23 of the vehicle is designated as a whole by the reference numeral 24 and is substantially in the form of an inverted U-shaped member, the depending prongs 25 of which are united by a horizontally disposed cross bar 26 which has its ends located and suitably secured in openings in said prongs. This cross bar is provided with an opening midway between the prongs 25 for the reception of the screw-threaded bolt 18 and at diametrically disposed points with respect to said opening a pair of slots 27 for the reception of the extension 12 on the lower end of the steering post 9, which arrangement will fix the support 24 to said post in such a way that they will be turned in either direction in unison. The upper ends of the prongs 25 are transversely united by a portion 28 preferably integral with said prongs, which portion is provided with an opening through which the steering post is extended, as is clearly shown.

By means of a nut 29 on the lower portion of the bolt 18 it is apparent that the hanger 24 can be adjusted with respect to the bearing plate 21 on the lower surface of the board 7 so that the cross head or portion 28 of the hanger 24 will contact with said plate and so that the steering post 9 and its head 16 will be securely held in position, yet in such a way that the hanger 24 and the steering wheel 23 which is suitably journaled in the lower portion of said hanger, may be readily turned in either direction by applying force to the handle bar 17 on the proper side of the steering head 16 of the device.

In Fig. 4 is illustrated a modification in the construction of the device, in which modification the steering head 16 of the just above described structure is omitted and the modified form of steering post 9ª is made of greater length than that of the other construction and is equipped with a handled cross bar 30 which is securely bolted to lateral extensions 31 with which the upper end of the post 9ª is provided and which are by preference integral members of said post. Besides, in this construction the steering post is provided about midway of its length with a cross bar 26ª which is centrally apertured for the reception of the upper end of the screw bolt 18 and has its ends extended through suitable diametrically disposed openings in the post 9ª so as to rest on the upper surface of the member 19 as is clearly shown in Fig. 4 of the drawing. Otherwise, the two structures are similar.

From the foregoing and by reference to the drawing it will be readily understood and clearly seen that by my improvements a very simple, reliable, and efficient steering mechanism is provided which by reason of the novel construction and arrangement of its parts will prevent wabbling movement of the steering post and yet will permit of the detachment of the steering post from the wheel hanger and seat board by simply removing the nut 29 from the lower portion of the bolt 18, which nut may be of the thumb-nut or any other type.

Having thus fully described my invention, what I claim as new and desire to secure by Letters Patent is:

1. In a mechanism of the class described, the combination with a seat board of a vehicle having a vertical opening near one of its ends, of a collar surrounding said opening, and secured to the upper surface of said board, a steering post rotatably journaled in said collar and board opening, a hanger mounted on the lower portion of said post to turn therewith and having a transverse portion at its upper end located adjacent the lower surface of said board, and a steering wheel journaled on the lower portion of said hanger.

2. In a mechanism of the class described, the combination with the seat board of a vehicle having a vertical opening near one of its ends, of a collar surrounding said opening and secured to the upper surface of said board, said collar terminating at its upper end in an inwardly and down-turned annular flange, a steering post rotatably journaled in said collar and board opening, a hanger mounted on the lower portion of said post to turn therewith and having a transverse portion at its upper end located adjacent the lower surface of said board, and a steering wheel journaled on the lower portion of said hanger.

3. In a mechanism of the class described, the combination with the seat board of a vehicle having a vertical opening near one of its ends, of a collar surrounding said opening and secured to the upper surface of said board, the said collar terminating at its upper end in an inwardly and downturned annular flange, a steering post rotatably journaled in said collar and board opening, a substantially inverted U-shaped hanger mounted on the lower portion of said post to turn therewith and having a transverse portion at its upper end located adjacent the lower surface of said board, a horizontally and transversely disposed member uniting the prongs of said hanger below said transverse portion, inter-engaging means on said member and the lower portion of said post, a screw-threaded bolt located within and carried by said post and extended through said member, a nut engaging said bolt below said member, and a steering wheel journaled on the lower portion of said hanger.

WILLIAM E. McLAREN.